United States Patent
Saad et al.

(10) Patent No.: US 7,975,493 B2
(45) Date of Patent: Jul. 12, 2011

(54) THERMOELECTRIC COOLER WITH INRUSH CURRENT CONTROL

(75) Inventors: Ricardo Saad, Plano, TX (US); Jiashu Chen, Santa Clara, CA (US); Saied Ansari, Oakland, CA (US)

(73) Assignee: Finisar Corporation, Sunnyvale, CA (US)

( * ) Notice: Subject to any disclaimer, the term of this patent is extended or adjusted under 35 U.S.C. 154(b) by 375 days.

(21) Appl. No.: 11/673,826

(22) Filed: Feb. 12, 2007

(65) Prior Publication Data

US 2008/0047278 A1    Feb. 28, 2008

Related U.S. Application Data

(60) Provisional application No. 60/772,350, filed on Feb. 10, 2006.

(51) Int. Cl.
*F25B 21/02* (2006.01)
*F25B 21/00* (2006.01)
*F25D 23/12* (2006.01)
*G05D 23/32* (2006.01)
*H01S 3/00* (2006.01)
*H01S 3/04* (2006.01)
*H01S 3/13* (2006.01)
*H04B 10/00* (2006.01)
*H04B 10/06* (2006.01)

(52) U.S. Cl. .............. 62/3.7; 62/3.1; 62/3.2; 62/259.2; 62/157; 62/158; 372/33; 372/34; 372/35; 372/36; 372/29.015; 372/38.01; 372/38.02; 372/38.07; 398/135; 398/138; 398/139; 398/202

(58) Field of Classification Search ............... 398/202, 398/135, 138, 139
See application file for complete search history.

(56) References Cited

U.S. PATENT DOCUMENTS

| | | | | |
|---|---|---|---|---|
| 4,838,032 A * | 6/1989 | Maslaney et al. | ............... | 62/3.7 |
| 5,185,736 A * | 2/1993 | Tyrrell et al. | ............... | 370/358 |
| 5,276,697 A * | 1/1994 | Davis | ............... | 372/38.07 |
| 5,867,513 A * | 2/1999 | Sato | ............... | 372/32 |
| 6,205,790 B1 * | 3/2001 | Denkin et al. | ............... | 62/3.7 |
| 6,310,901 B1 * | 10/2001 | Mahmoudi et al. | ........ | 372/38.02 |
| 6,396,858 B2 * | 5/2002 | Kawakami et al. | ........ | 372/38.02 |
| 6,529,534 B1 * | 3/2003 | Yasuda | ............... | 372/32 |
| 6,678,628 B2 * | 1/2004 | Ryan et al. | ............... | 702/132 |
| 6,868,235 B2 * | 3/2005 | Tokita et al. | ............... | 398/182 |
| 6,978,624 B2 * | 12/2005 | Carlson et al. | ............... | 62/3.7 |
| 7,028,491 B2 * | 4/2006 | Horton | ............... | 62/158 |
| 2002/0121094 A1 * | 9/2002 | VanHoudt | ............... | 62/3.3 |
| 2004/0008996 A1 * | 1/2004 | Aronson et al. | ............... | 398/202 |
| 2004/0031272 A1 * | 2/2004 | Mecherle et al. | ............... | 62/3.7 |
| 2005/0039465 A1 * | 2/2005 | Welch | ............... | 62/3.7 |
| 2006/0032238 A1 * | 2/2006 | Uchida | ............... | 62/3.7 |

OTHER PUBLICATIONS

Machine Translation by Paj of JP 2006-054316, Tanaka, Optical Module and Light Transmission Device, Feb. 23, 2006, Paj, all.*

* cited by examiner

*Primary Examiner* — Ljiljana (Lil) V Ciric
*Assistant Examiner* — Filip Zec
(74) *Attorney, Agent, or Firm* — Maschoff Gilmore & Israelsen

(57) ABSTRACT

Systems and methods for controlling a thermoelectric cooler (TEC) in an optical transceiver. A TEC system includes a processor that interacts with a power supply and a TEC controller to prevent inrush current. The power supply is switched by the processor and turned on only at a particular time. The power supply has a relatively large time constant such that it ramps slowly to its full value. In the meantime, the processor and TEC controller cause the temperature to ramp to a target value by repeatedly incrementing or decrementing a target value over time and by controlling when the maximum available voltage can be applied to the TEC.

15 Claims, 4 Drawing Sheets

THERMOELECTRIC COOLER WITH INRUSH CURRENT CONTROL

This application claims the benefit of U.S. Provisional Application Ser. No. 60/772,350 entitled THERMOELECTRIC COOLER WITH INRUSH CURRENT CONTROL and filed Feb. 10, 2006, which application is incorporated by reference in its entirety.

BACKGROUND OF THE INVENTION

1. The Field of the Invention

The present invention relates to optical transceivers. More particularly, embodiments of the invention relate to devices that provide inrush current control TECs used to cool/heat lasers in optical transceivers.

2. Background and Relevant Art

Fiber optic networks use light signals to transmit data over a network. Although light signals are used to carry data, the computers and other network devices that use the data in the light signals rely on electrical signals. As a result, it becomes necessary to convert the light signals into electrical signals in order to extract and use the data. Also, it is necessary to convert electrical signals into light signals to transmit the data over the optical network. The conversion of an optical signal into an electrical signal and the conversion of an electrical signal into an optical signal is achieved using an optical transceiver.

An optical transceiver is a device that typically includes both a receiving optical sub assembly (ROSA) and a transmitting optical sub assembly (TOSA). The ROSA receives the light signal with a photodiode or other light detector, which converts the light signal into an electrical signal. The electrical signal is then amplified and further processed for use by the receiving device.

A TOSA typically includes a laser that generates the light that is launched into the optical network. When a device desires to transmit data, the light emitted by the laser is modulated accordingly. Thus, the data carried by the light signal often originates as an electrical signal and the conversion of an electrical signal into a light signal is usually accomplished using the laser in the TOSA.

Optical transceivers, such as the XFP, SFP, GBIC and other form factors, are typically required to comply with a standard. The XFP MSA, for example, has adopted the 10 Gigabit Small Form Factor Pluggable Module specification. This XFP MSA specification defines the mechanical, management, and electrical interfaces of the XFP module.

The XFP MSA specifies certain current requirements of an XFP module. Currently, the XFP MSA specification requires that current should be less than 1 amp under all conditions. Current exceeding this ceiling can have adverse effects. The XFP module itself or some of its components, for example, may be harmed by excessive current. Systems interacting with the XFP module may also be harmed or caused to malfunction by excessive current.

One of the important components of an XFP module is the laser. As is known in the art, lasers are sensitive to temperature. In fact, the wavelength emitted by a laser can vary with temperature. For at least this reason, among others, it is useful to control the laser temperature. This is done using a device such as a thermoelectric cooler (TEC), which can provide precise temperature control.

The current requirements of a TEC are often related to temperature differentials. The size of the temperature differential can have an impact on the current requirements of the TEC. When an XFP module, for instance, is initially powered on, it is likely that there is a significant temperature differential between the actual temperature of the laser and the target temperature of the XFP module. In an effort to drive the XFP to the proper temperature, an inrush current may be may be drawn by the TEC that exceeds the maximum current specified for the module.

The inrush current is a transient current that may be experienced when an XFP module is powered on or in other situations where a relatively large temperature differential is present that results in current requirements for the TEC that exceed specification.

BRIEF SUMMARY OF THE INVENTION

These and other limitations are overcome by embodiments of the invention which relates to systems and methods for controlling inrush current in optical transceivers and more particularly in thermoelectric coolers (TECs). Thermoelectric coolers are devices that can control the temperature of lasers used in optical transceivers. When the actual temperature of a laser and the target temperature of the laser differ significantly, the resulting current consumed by the TEC may exceed the maximum current specified for the optical transceiver. Embodiments of the invention control or prevent this inrush current.

An exemplary TEC system includes the TEC itself, a thermistor to monitor the actual temperature of the laser, a TEC controller, a processor, and a power supply for the TEC system. The processor generates various signals that are used to control, in a timely manner, the way in which components of the TEC system can operate as well as when those components can operate prior to the TEC system achieving a steady state. In other words, the timing of the signals generated in the TEC system is set such that the inrush current is not experienced.

When the TEC system powers up (e.g., an optical transceiver that is hot pluggable is inserted into a host), the signal from the processor of the TEC system that controls the power supply to the TEC system is set such that the power supply is initially off Also, the processor ensures that the TEC controller can only apply a minimal voltage to the TEC. Ensuring a minimal voltage has the effect of limiting current. After the processor completes its boot up sequence, other signals are then activated. The signal from the processor controlling the power supply, however, remains set such that the power supply is still off The signal enabling the TEC controller is asserted, however.

After a first time period from when the processor activates certain signals, the power supply is turned on and the processor begins to sample the actual temperature of the laser. The signal identifying the target temperature of the laser is set to be the same as the actual temperature. This ensures that the TEC operates in a neutral condition and requires minimal current.

After another time period has passed and while the power supply is still ramping to its full value, the signal controlling the maximum voltage across the TEC is changed to enable the maximum voltage and the signal identifying the target temperature is incremented or decremented. As a result of changing the signal identifying the target temperature, the TEC controller begins to heat or cool the laser accordingly because the target temperature now differs from the actual temperature. This in turn changes the actual temperature of the laser.

This process is repeated (the signal identifying the target temperature is decremented or incremented) until the actual temperature is within a predetermined threshold of the target value. In effect, the actual temperature of the laser is ramped to the target value. Note that this process may occur before the power supply reaches its full value because of the time constant associated with the power supply. After the temperature is stabilized, the TEC system enters a steady state and the processor is notified of this state by the TEC controller.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Embodiments of the invention relate to systems and methods for controlling inrush current in an optical transceiver. In particular, embodiments of the invention relate to systems and methods for controlling the excessive transient current that may be experienced when a transceiver module, such as an XFP module, is powered on. One example of an inrush current is the current required to drive a thermoelectric cooler (TEC) when a relatively large temperature differential is detected (i.e., the difference between an actual temperature of the laser and a target temperature of the laser). Embodiments of the invention ensure that the current requirements of a TEC do not exceed specified current limits.

Embodiments of the invention are described with reference to optical transceivers including XFP, SFP GBIC, etc., transceiver modules. In view of the teachings of the present invention, one of skill in the art can appreciate that embodiments of the invention can be used to control the current consumed by a TEC or other device.

Figure 1:
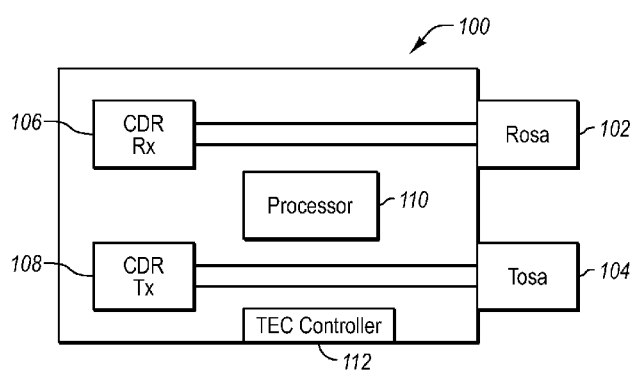
FIG. 1 illustrates an exemplary block diagram of an optical transceiver.

FIG. 1 illustrates an exemplary transceiver 100. The transceiver 100 includes a ROSA 102 and a TOSA 104. The ROSA 102 is used by the transceiver 100 to receive and begin processing incoming light signals that are received over an optical fiber. The ROSA 102 receives incoming light signals and converts the incoming light signals to an electrical signal using, for example, a photodiode. A clock and data recovery (CDR) module 106 analyzes the electrical signal output by the ROSA 102 and extracts the data and/or clock signal. The CDR module 106 may also reshape and retime the resulting electrical signal for use by a host of the transceiver 100. Similarly, the TOSA 104 functions to transmit light signals over an optical network. The CDR module 108 can reduce jitter, retime, and/or reshape the electrical signal before the electrical signal is converted to an optical signal by the TOSA 104.

The transceiver 110 further includes a TEC controller 112. The TEC controller 112 is connected with and controls a TEC that is usually located within the TOSA 104. The temperature of the laser or of the TOSA 104 is controlled through the TEC controller 112 by causing the TEC to either heat or cool the laser.

The transceiver 110 includes a controller or a processor 110. The processor 110 is typically connected with both the ROSA 102 and the TOSA 104. The processor 110 plays a role in clock recovery, adjustment of the TOSA 104, control and adjustment of analog to digital and digital to analog converters in the transceiver 100, and the like. The processor 110 also interacts with the TEC controller 112 to control the temperature of the laser in the TOSA 104 and to prevent inrush current. In one embodiment of the invention, the processor 110 controls the TEC controller 112 such that excessive current is not generated in the transceiver 100.

Figure 2:
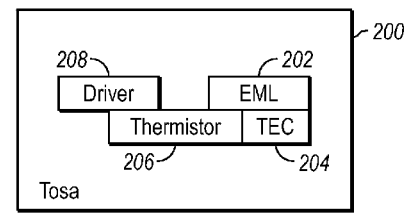
FIG. 2 illustrates a block diagram of a transmitter optical sub assembly.

FIG. 2 is an exemplary block diagram of a TOSA. The TOSA 200, which is one embodiment of the TOSA 104 in FIG. 1, includes a laser 202. The laser 202 is an externally modulated laser (EML), but other types of lasers (both edge-emitting and vertical cavity surface emitting) may be used. The driver 208 drives the laser 202 and may also control the modulation. The driver 208 is connected with and controlled by the processor 110.

The TOSA 200 includes a TEC 204. The TEC 204 is controlled by the TEC controller 112 and/or the processor 110. The TEC 204 is positioned in the TOSA 200 such that it can control the temperature of the laser 202. A thermistor 206 is used to sense the temperature of the laser 202. The signal generated by the thermistor 206 is then provided to the TEC controller 112 and/or the processor 110. One of skill in the art can appreciate that the actual temperature of the laser may be inferred from the signal from the thermistor 206.

Figure 3:
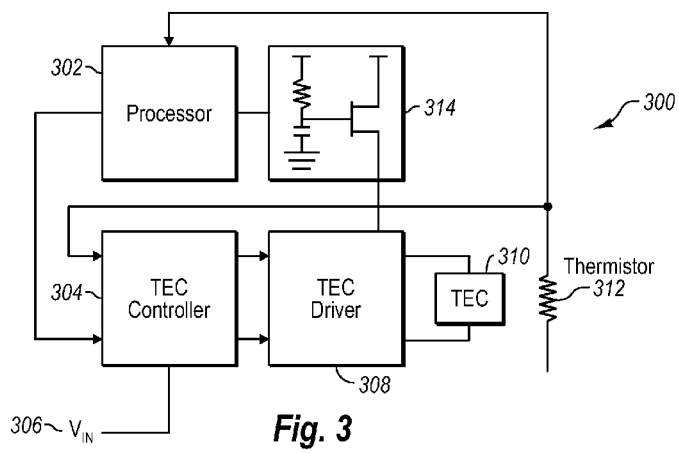
FIG. 3 illustrates an exemplary block diagram of circuitry for controlling inrush current in an optical transceiver and more particularly in the TEC system of the optical transceiver.

FIG. 3 illustrates an exemplary block diagram of a TEC system for controlling a TEC or for preventing inrush current. The TEC system 300 is typically part of an optical transceiver, such as the transceiver 100 in FIG. 1. The processor 302 receives a signal from the thermistor 312. The temperature of the laser or of the TOSA is determined from the signal received from the thermistor 312.

The power supply 314 provides power to the TEC driver 308, which is controlled in turn by the TEC controller 304. The processor 302 interfaces with the power supply 314 and the TEC controller 304 to provide further control over the current required or consumed by the TEC driver 308 and the TEC 310. The voltage 306 is a reference voltage used by the TEC controller 304 and assists in limiting or preventing inrush current. The voltage 306 can control the voltage applied to the TEC 310. When asserted, for example, the voltage 306 limits the voltage across the TEC 310 to 0.1 V and when de-asserted, the voltage across the TEC can assume its maximum value of 0.8 V in this example. Other transceiver designs may contemplate other voltage levels for the TEC 310.

Figure 4:
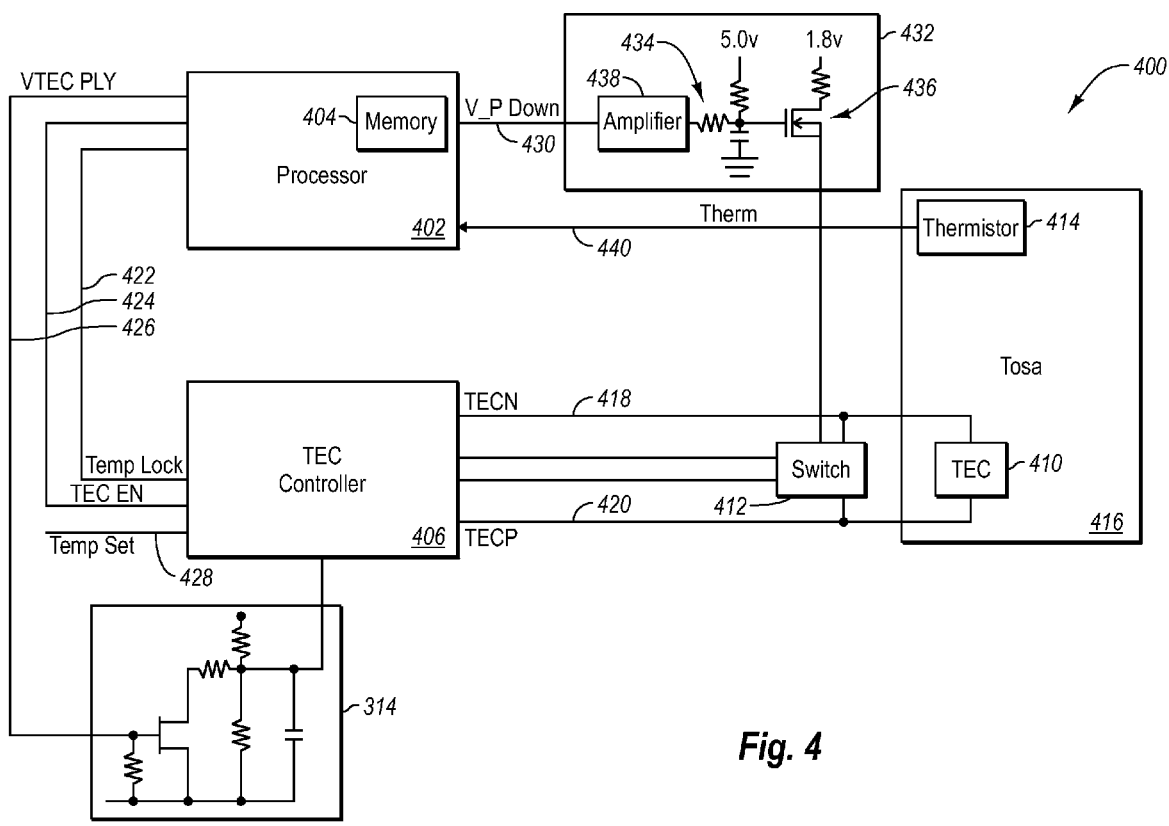
FIG. 4 illustrates a more detailed view of a TEC system that controls inrush current such that excessive current does not occur.

FIG. 4 illustrates a more detailed schematic of the circuitry illustrated in FIG. 3. FIG. 4 illustrates exemplary modules, components and/or circuitry to prevent inrush current in an optical transceiver. The embodiment of FIG. 4 includes both a hardware aspect and a firmware or software aspect. The following discussion references certain timing patterns for asserting and/or deasserting the signals generated in the TEC system 400 that can prevent inrush current. Embodiments of the invention are not limited to these specific timing values and one of skill in the art can appreciate that the timing values can be selected based on specific implementations and circuit component values (resistive values, capacitive values, etc.).

In order to control or prevent the inrush, several signals have been provided. The signal 430 (V_PDOWN) is a generated by the processor 402. The signal 430 is used by the processor 402 to turn the power supply 432 off or on. The power supply 432 used by the TEC in this example and associated circuitry is 1.8 V per the XFP specification. The power supply 432 powers the TEC 410 and its driving MOSFETs. In this example, there is a capacitive network 434 attached to the gate of the MOSFET 436. The capacitor in the network 434 has a relatively large value to ensure that the power supply 432 typically turns on relatively slowly. The capacitor values and resistor values in the network 434 can be changed to adjust the timing constant associated with turning the power supply 432 on or off The signal 430 provided by the processor 402 may be buffered or amplified by the stage 436.

This enables the TEC 410 to either provide cooling and/or heating as necessary.

The signal 426 (VTEC_DLY) is the signal that controls the maximum voltage applied to the TEC 410. The signal 426 is generated by the processor 402 and applied to the TEC controller 406 through a stage 408. The signal 426 is usually applied in two steps. When the signal 426 is low, the maximum voltage applied to the TEC 410 is limited to 0.1 Volts. When the signal 426 is high, the maximum voltage is 0.8 Volts. When the signal 426 is high, the TEC 410 can fully cool or heat the laser and can therefore absorb a large quantity of current.

The signal 428 (TEMPSET) is the signal that controls or identifies the target temperature of the laser. The signal 428 may be received, for example, from a serial DAC that is controlled by the processor 404. When the signal 428 is higher than the laser's actual temperature, the TEC controller 406 should cause the TEC 410 to heat the laser. When the signal 428 is lower than the laser's actual temperature, the TEC controller 406 should cause the TEC 410 to cool the laser.

As previously described, when the difference between the signal 428 (the target temperature of the laser) and the actual temperature (from the signal 440) of the laser is large, a proportionally large current is required to supply the TEC 410 such that the actual temperature of the laser can approximate the target temperature of the signal 428. This approximation usually happens quickly and without any control and therefore results in a large inrush current as previously described.

In this example, the signal 424 (TEC_EN) is sent by the processor 402 to the TEC controller 406 to enable the TEC controller 406. When this signal is active and other conditions are satisfied, a large inrush current may occur as previously stated. Embodiments of the invention extend to controlling the times at which the signal 424 and the other signals discussed herein are active to prevent the large inrush current from occurring or to ensure that the maximum specified current for the transceiver is not exceeded.

The signal 440 (THERM) is output from the thermistor 414 or other device that monitors or measures the temperature inside the device where the TEC 410 resides or more particularly to measure the temperature of the laser. The signal 440 measures the temperature of the laser in one embodiment and provides this measurement to the processor 402 and to the TEC controller 406. The TEC controller 406 can compare the signal 440 to the signal 428 to control any heating or cooling actions that may be required.

The signal 422 (TEMPLOCK) is output from the TEC controller 406 to indicate that a temperature locking condition has been satisfied. The TEC controller 406 or the processor 402 can compare the signal 440 (temperature of the laser) with the signal 428 (target temperature of the laser) and assert the signal 422 when these signals match.

Using these signals, the inrush current can be controlled. When the transceiver is powered up, the power supply 432 is switched off using the signal 430. The default condition of the signal 430 is such that the power supply 432 is off At this time, the signal 426 (VTEC_DLY) is set to limit the maximum voltage across the TEC 410 to 0.1 Volts. The TEC 410 and its controlling circuitry are therefore effectively turned off and all of the other signals are not yet available as they come from the processor 402 which may still be in a boot-up stage.

After the processor 402 completes its boot up process (a few hundred microseconds), the signals 428, 424, 440, and 422 become active. The signal 430 is still held high (or low depending on circuit design) such that the power supply 432 remains off and the maximum TEC voltage is limited to 0.1 V by the signal 426. The system then waits for transient current caused by the passive components to dissipate. The signal 424 (TEC_EN) is activated at this time.

About 150 milliseconds later or after a specified first time period, the processor 402 activates the power supply 432 by setting the signal 430 low. At the same time, the processor 402 begins sampling the signal 440 (THERM) and sets the signal 428 (TEMPSET) to the same level. Because the signal 428 is set at the same level of the signal 440, the current requirements of the TEC 410 are limited. In effect, the TEC 410 is controlled to operate in a neutral condition. Cooling or heating is therefore not required and no current is required by the TEC. Because the power supply 432 has been turned on, it begins to ramp up to its full value with a time constant determined by the network 434 (about 1 second in one embodiment).

Another 150 milliseconds later or a specified time period after the first time period, the microcontroller begins to sample the signal 440 (THERM) and turns on the signal 426 (VTEC_DLY). Turning on the signal 426 allows the maximum voltage across the TEC 410 to be 0.8 Volts. At this point, the power supply 432 has not reached its final value because of the comparatively large time constant (on the order of 1 second in one embodiment). The TEC 410 is therefore only partially powered.

As a result, a temperature ramping process begins. The processor 402 increments (or decrements) the signal 428 (TEMPSET) to its target value. This process continues (sampling the signal 440 and then incrementing or decrementing the signal 428) repeatedly until the signal 428 is within a narrow range of its target value. The time this process takes is dependent upon the temperature difference between the target value and the actual initial value of the laser.

In other words, the signal 428 was initially set to be equal to the initial value of the signal 440. As the signal 428 is incremented, the TEC 410 is driven to heat or cool the laser.

As a result of this change, the signal 440 also changes to measure the new temperature of the laser. This temperature ramping process continues until the signal 428 is within a threshold of its target value. This process ensures that the temperature specified by the signal 428 does not vary from the signal 440 to an extent that would require excessive current. As previously explained, the temperature is ramped to its target value.

Once the temperature of the laser is stabilized, such as when the difference between the measured temperature of the laser and the target temperature identified by the signal 428 is less than a preset threshold, the system 400 enters a steady state. This is also reported from the TEC controller 406 by asserting the signal 422 (TEMPLOCK).

Figure 5:
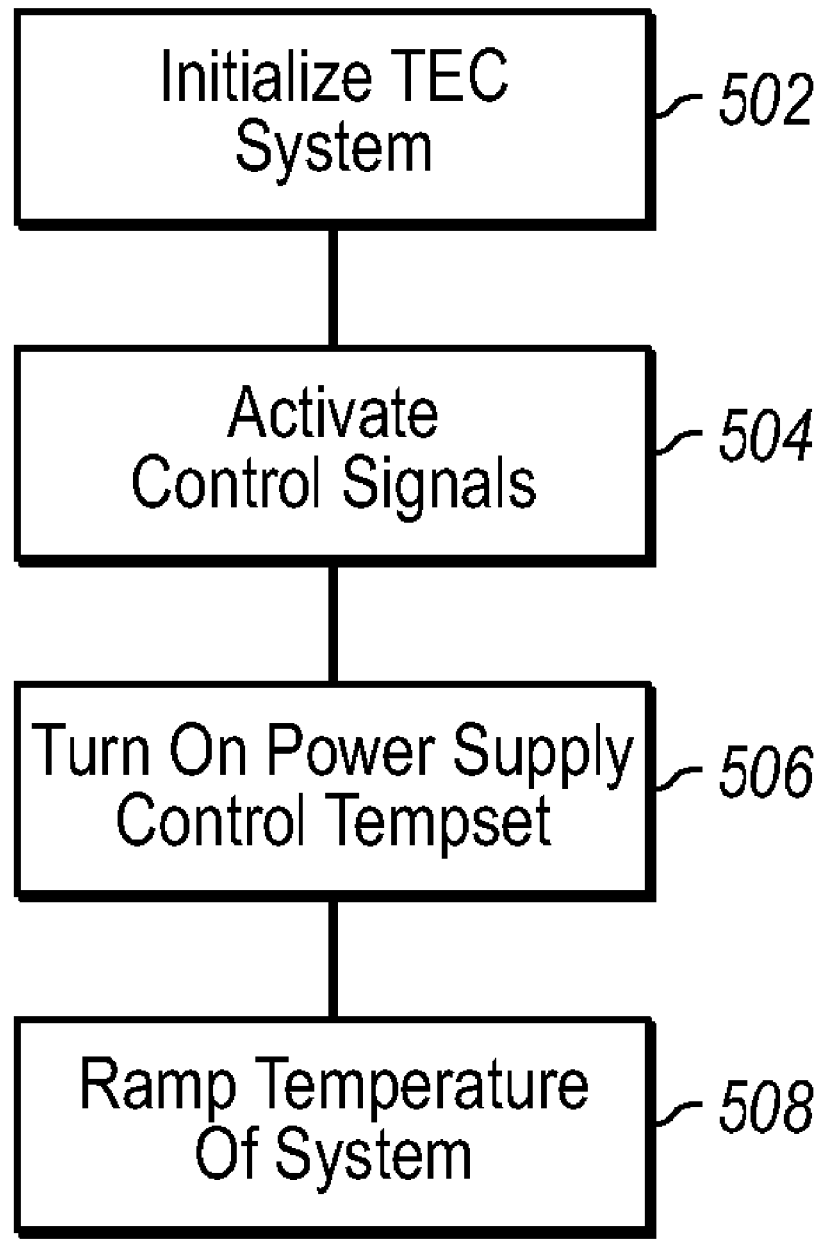
FIG. 5 illustrates a flow diagram for controlling inrush current in a TEC system.

FIG. 5 illustrates an exemplary method for preventing inrush current in an optical transceiver and more particularly to preventing inrush current in the TEC system of an optical transceiver. The method illustrated in FIG. 5 typically begins by initializing 502 the TEC system. Initializing the TEC system may include limiting the power supply by insuring that the power supply to the TEC system is off by default or during boot up conditions. In addition, the voltage available to the TEC is limited to 0.1 V during initialization procedures. As previously stated, turning the power supply off and limiting the available voltage across the TEC can effectively prevent the inrush current from spiking, for example, during start up conditions such as hot plugging an XFP module or other transceiver.

The processor completes its boot up process during the initialization of the system and the system then activates (504) various control signals including, TEMPSET, TEC_EN, THERM, and TEMPLOCK. The power supply is not turned on yet and any transient currents are allowed to dissipate. The TEC_EN signal is enabled at this point.

About 150 milliseconds later or other specified time period, the processor enables (506) the power supply, which builds slowly according to a corresponding time constant of about 1 second in one embodiment. At substantially the same time, the processor samples the temperature of the laser and sets the TEMPSET to match the value of THERM. This ensures that the TEC does not draw current as heating or cooling are not required.

About 150 milliseconds later or after another specified time period, the control signal limiting the voltage across the TEC is changed such that the maximum voltage is available to the TEC. However, the power supply is not yet at its full capacity because it has a time constant of 1 second. With the TEC partially powered, a temperature ramping (508) process begins. The TEMPSET signal is incremented or decremented slowly to either heat or cool the laser. This process is repeated until the laser is within threshold of a target temperature. The TEC system then enters the steady state and the TEC controller asserts the TEMPLOCK signal.

Figure 6:
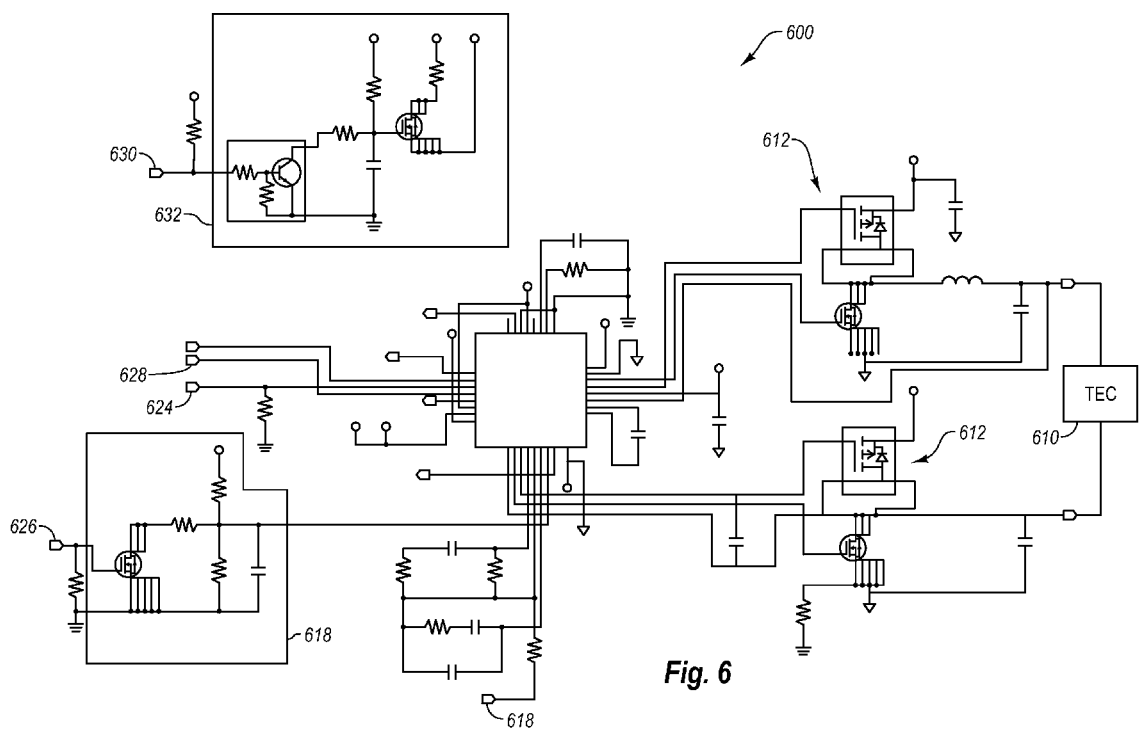
FIG. 6 illustrates an exemplary schematic of a TEC system including a power supply for the TEC system.

FIG. 6 illustrates one embodiment of a TEC system 600. The signal 630 from a processor controls the power supply 632. The TEC controller 606 is one embodiment of a TEC controller. The TEC controller receives various inputs and has various outputs. The inputs include, the signal 626 (VT-EC_DLY), the signal 628 (TEMPSET), the signal 624 (TEC_EN), and the like. The TEC 610 is controlled and driven by the power supply 632, the TEC controller 602 and the processor of the transceiver.

Embodiments of the invention include the signals that are asserted and/or de-asserted according to a specific timing schedule. Controlling these signals according to the timing schedule ensures that excessive current is not present in the TEC system or in the optical transceiver.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A thermoelectric cooler system for controlling inrush current in an optical transceiver, the system comprising: a power supply configured to supply power to a thermoelectric cooler that adjusts a temperature of a laser; a thermoelectric cooler controller that controls the thermoelectric cooler; a processor programmed to perform the following steps according to a timing schedule that is set to prevent current in the thermoelectric cooler from exceeding a threshold current: initialize the thermoelectric cooler system during power on of the thermoelectric cooler system by at least ensuring that a first signal outputted by the processor turns off the power supply of the thermoelectric cooler system; activate a second signal, a third signal, and a fourth signal after the processor finishes a boot up process, the second signal turning on the thermoelectric cooler controller, the third signal determining a target temperature of the laser, the fourth signal controlling the maximum voltage across the thermoelectric cooler of the thermoelectric cooler system; assert the first signal to turn the power supply on and sampling a fifth signal from a thermistor of the thermoelectric cooler system, wherein the processor sets the third signal to be the same as the fifth signal such that substantially no current is required by the thermoelectric cooler; turn on the fourth signal to apply the maximum voltage across the thermoelectric cooler and incrementing or decrementing the third signal to ramp a temperature to an operating value; enter a steady state once an actual temperature of the laser reaches, or is within a predetermined threshold of the target temperature.

2. The system as defined in claim 1, wherein the processor is programmed to activate the power supply after completing power up and boot up of the processor.

3. The system as defined in claim 2, wherein the processor is further programmed to enable the TEC controller that controls the TEC after completing the boot up and while the power supply is off.

4. The system as defined in claim 1, wherein the processor is programmed to activate a power supply delay period after enabling the TEC controller that controls the TEC.

5. The system as defined in claim 4,
wherein, during the delay period after activating the power supply, the processor is programmed to keep the TEC from adjusting the temperature of the laser by repeatedly sampling the current temperature measured by the thermistor and repeatedly defining a temperature setting of the TEC substantially equal to the measured current temperature.

6. The system as defined in claim 5, wherein while the processor repeatedly defines the temperature setting of the TEC substantially equal to the measured current temperature the power supply is configured to ramp to a full power level based on a time constant defined by a capacitive network connected to the power supply.

7. The system as defined in claim 6, wherein the processor is programmed to incrementally adjust the temperature setting of the TEC to ramp a temperature of the laser to the target temperature while the power supply is still ramping to the full power level.

8. The system as defined in claim 7, wherein the processor is programmed to stop restricting the maximum voltage applied to the such that the maximum voltage is available to the TEC when the processor incrementally adjusts the temperature setting of the TEC.

9. The system as defined in claim 8, wherein a TEC controller is configured to indicate to the processor when the measured temperature of the laser is within a predetermined threshold of the temperature setting of the TEC.

10. A method for controlling a thermoelectric cooler in an optical transceiver to prevent an inrush current, the method comprising initializing a thermoelectric cooler system during power on of the thermoelectric cooler system by at least ensuring that a first signal outputted by a processor ensures that a power supply of the thermoelectric cooler system is turned off;

activating a second signal, a third signal, and a fourth signal after the processor finishes a boot up process, the second signal turning on a thermoelectric cooler controller, the third signal determining a target temperature of the laser, the fourth signal controlling the maximum voltage across a thermoelectric cooler of the thermoelectric cooler system; asserting the first signal to turn the power supply on and sampling a fifth signal from a thermistor, wherein the processor sets the third signal to be the same as the fifth signal such that substantially no current is required by the thermoelectric cooler; turning on the fourth signal to apply the maximum voltage across the thermoelectric cooler and incrementing or decrementing the third signal to ramp a temperature to an operating value;

entering a steady state once an actual temperature of the laser reaches, or is within a predetermined threshold level of the target temperature.

11. The method of claim 10, wherein initializing the system further comprises disabling the second signal, the third signal, and the fourth signal at least until the boot up process of the processor is finished.

12. The method of claim 10, wherein the power supply further comprises a capacitive network having a time constant of about 1 second such that the power supply ramps to full power according to the time constant.

13. The method of claim 10, wherein asserting the first signal to turn on the power supply occurs about 150 milliseconds after the second signal enabling the TEC controller is set.

14. The method of claim 10, wherein turning on the fourth signal to allow the maximum voltage to be applied across the TEC occurs about 150 milliseconds after asserting the first signal to turn on the power supply.

15. The method of claim 10, wherein entering a steady state further comprises the TEC controller reporting the steady state by asserting a sixth signal reporting the steady state to the processor.

* * * * *